United States Patent [19]

Goll

[11] 4,416,925

[45] Nov. 22, 1983

[54] VARNISH AND A METHOD OF COATING PLASTIC WITH POLYVINYLIDENE FLUORIDE

[75] Inventor: Werner Goll, Hart, Fed. Rep. of Germany

[73] Assignee: SKW Trostberg Aktiengesellschaft, Trostberg, Fed. Rep. of Germany

[21] Appl. No.: 295,936

[22] Filed: Aug. 24, 1981

Related U.S. Application Data

[63] Continuation of Ser. No. 110,583, Jan. 9, 1980, abandoned.

[30] Foreign Application Priority Data

Jan. 19, 1979 [DE] Fed. Rep. of Germany ....... 2902095

[51] Int. Cl.$^3$ .............................................. B05D 3/02
[52] U.S. Cl. ............................ 427/393.5; 427/385.5; 427/389.7; 427/389.8; 524/108; 524/113; 524/233; 524/234; 524/296; 524/315; 524/317; 524/364; 524/365; 524/360; 524/545
[58] Field of Search ............... 427/385.5, 393.5, 389.7, 427/389.8; 524/364, 360, 315, 317, 296, 233, 234, 113, 108, 365, 545

[56] References Cited

U.S. PATENT DOCUMENTS 3,642,684  2/1972  Kusuno et al. ...................... 524/234
3,773,713  11/1973  Koizumi et al. ..................... 523/435
3,944,689  3/1976  Luckock et al. .................. 427/385.5

FOREIGN PATENT DOCUMENTS 2632185  1/1977  Fed. Rep. of Germany .

*Primary Examiner*—Thurman K. Page
*Attorney, Agent, or Firm*—Felfe & Lynch

[57] ABSTRACT

For the coating of plastics with polyvinylidene fluoride, finely divided polyvinylidene fluoride is dispersed in a solvent mixture of (a) at least one high-boiling, organic solvent with a boiling point up to 250° C., which dissolves polyvinylidene fluoride little or not at all, and (b) at least one strongly polar latent organic solvent for polyvinylidene fluoride, the dispersion obtained is dissolved in (c) at least one low-boiling polar organic solvent with a boiling point up to 120° C., the plastic surface is coated with the solution and the latter is baked on at a temperature of 100° to 300° C.

A bake-on varnish suitable for the method contains, for example:

3 to 25 wt.-% of polyvinylidene fluoride, 5 to 20 wt.-% of at least one high-boiling organic solvent with a boiling point up to 250° C., 1 to 10 wt.-% of at least one strongly polar latent organic solvent for polyvinylidene fluoride and 60 to 90 wt.-% of a low-boiling polar organic solvent with a boiling point up to 120° C., as well, if desired, as conventional ultraviolet light absorbers and/or additive resins.

20 Claims, No Drawings

VARNISH AND A METHOD OF COATING PLASTIC WITH POLYVINYLIDENE FLUORIDE

This is a continuation of application Ser. No. 110,583, filed Jan. 9, 1980, now abandoned.

The invention relates to a bake-on varnish and a method of coating plastics with polyvinylidene fluoride, especially plastics not resistant to weathering.

It is known that plastics such as polyvinyl chloride, polyesters, melamine-formaldehyde condensation products and the like, undergo decomposition reactions on the surface after long outdoor weathering, whereby their surface becomes unsightly (chalking) and easily soiled. By the addition of stabilizers and plasticizers, the decomposition of the plastics is halted for a time, but these additives have a tendency to diffuse to the surface so that the advantages which they offer, such as resilience and flexibility, are gradually lost.

Consequently, such plastic surfaces have in the past been coated with a so-called sealing varnish, on the basis, for example, of acrylate resins, in order to improve surface quality. It has not been possible in this manner to prevent the diffusion of the plasticizer any more than the incorporation of a textile fabric has been able to prevent the loss of the mechanical strength of a plastic film. A certain improvement of plastics with respect to atmospheric influcnes has been achieved by the preparation of suitable co-polymers, but they have achieved only a limited resistance to thermal and ultraviolet degradation.

On the basis of the applicant's German Offenlegungschrift No. 2,217,375, solutions of polyvinylidene fluoride in acetone are known, which can also be used for the coating of such plastics as polyvinyl chloride and polyester. It has been found, however, the coatings made from such solutions on plastics, especially poorly weathering plastics such as polyvinyl chloride, do not have sufficient resistance to weathering, and can become separated from the substrate by atmospheric action. Their resistance to corrosion also leaves much to be desired. This is especially the case under highly corrosive atmospheric conditions, such as the presence of aggressive industrial exhaust gases, such as exhausts containing sulfur dioxide, salt water droplets, and the like.

The invention, therefore, is addressed to the problem of providing plastics, especially poorly weathering plastics, with a strongly adherent and corrosion-resistant polyvinylidene fluoride coating, of preventing degradation of the surface of the plastic, of preventing the diffusion of the plasticizer out of the plastic, and of assuring a lastingly attractive surface on the plastic.

This problem is solved in accordance with the invention by a bake-on varnish for the weather-resistant coating of plastics, such is characterized by a content of 3 to 25 wt.-% of polyvinylidene fluoride, 5 to 20 wt.-% of at least one high-boiling organic solvent having a boiling point up to 250° C., 1 to 10 wt.-% of at least one strongly polar latent organic solvent for polyvinylidene fluoride, and 60 to 90 wt.-% of a low-boiling polar organic solvent having a boiling point up to 120° C.

In further development of the invention, ultraviolet light absorbing agents can be added to this varnish in amounts of 0.025 to 3 wt.-% with respect to the polyvinylidene fluoride, and also acrylate and/or polyester and/or urethane resins in amounts of 0.5 to 10 wt.-% with respect to the polyvinylidene fluoride, and also their hardeners.

With the varnish of the invention an extremely firmly adherent coating is obtained, which gives the plastic the advantageous properties of polyvinylidene fluoride, namely resistance to light, heat and chemicals, high surface elasticity, scratch resistance and resistance to soiling. An additional increase of the strength of adhesion and resistance to scratching of the varnish coating can be achieved, if desired, by means of additive resins. The ternary solvent mixture contained in the varnish of the invention not only brings about the formation of a clear solution which excels in this regard the polyvinylidene fluoride solutions known hitherto, but also results in an activation of the surface of the plastic to be coated, resulting in an excellent and long-lasting adhesion of the varnish to the plastic surface and protecting the latter also against aggressive atmospheric influences. Due to the special properties of the ternary solvent mixture, the film formation is also improved, and the surface film that is formed is especially homogeneous and is free of tensions. Even several months of outdoor weathering has resulted in no impairment of the strength of the adhesion of the varnish coating to the plastic surface.

The varnish of the invention produces clear coatings. For the production of colored and/or dull or opaque coatings, however, inorganic or organic pigments as well as known inorganic dulling agents can be added without impairing the advantageous properties.

Preferably the varnish of the invention contains 4 to 16% of polyvinylidene fluoride. The amount of the strongly polar latent organic solvent is preferably 2 to 7 weight-percent. Especially appropriate solvents of this group are the alkyl phthalates, such as, for example, dimethyl phthalate, low aliphatic acid amides such as dimethyl formamide and dimethyl acetamide as well as diethyl formamide and diethyl acetamide, acetyl acetone, propylene carbonate, methyl ethyl ketone, tetrahydrofuran, epichlorhydrin and halogenated solvents such as methylene chloride and chloroform. The term "latent solvent" means, in the scope of the invention, a solvent action on polyvinylidene fluoride, which becomes especially manifest at elevated temperatures. Preferred high-boiling organic solvents are cyclohexanone (bp 156.7° C.), butyl acetate (bp 126° C.), diacetone alcohol (bp 167.9° C.), dibutyl ketone (bp 186°–187° C.), diisobutyl ketone (bp 168° C.) and ethylene glycol acetate (bp 182° C.) as well as mixtures thereof. The high-boiling organic solvent serves in the scope of the invention as a dispersing agent which does not of itself have any great ability to dissolve polyvinylidene fluoride.

Ketones having a boiling point up to about 100° C. are preferred as low-boiling polar organic solvents. Especially suitable is acetone, in which the moisture content preferably does not exceed 0.5% by weight.

Ultraviolet light absorbing agents which can be used in accordance with the invention are organic compounds on a basis of benzotriazole, benzophenone and acrylonitrile acid ester, and combinations thereof.

Of the above-named acrylate and/or polyester and/or urethane resin additives, polyisocyanate-crosslinking acrylic resins are used preferentially.

The method of coating plastics with polyvinylidene fluoride in accordance with the invention is characterized by dispersing finely divided polyvinylidene fluoride in a solvent mixture of:

(a) at least one high-boiling organic solvent having a boiling point up to 250° C., which dissolves polyvinylidene poorly or not at all, and
(b) at least one strongly polar latent organic solvent for polyvinylidene fluoride,
dissolving the dispersion in
(c) at least one low-boiling polar organic solvent having a boiling point up to 120° C., in which ultraviolet light absorbing agents and additional resins are predissolved if desired,
coating the plastic surface with the solution, and baking it on at a temperature of 100° to 300° C.

In the first step of the method of the invention, i.e., the preparation of the dispersion, a polyvinylidene fluoride having an average primary particle size of less than 0.5 μm is preferably used. This is dispersed in the high-boiling organic solvent and then the strongly polar, latent organic solvent is added. Optionally, a mixture of these two solvents can also be used for the dispersion. With respect to the dispersion thus obtained, the polyvinylidene fluoride content amounts to approximately 20 to 60% by weight, preferably 30 to 40%. The content of the strongly polar, latent organic solvent in the total dispersion can amount to up to 30%, preferably up to a maximum of 25%, by weight. It is best not to use less than 5 weight-percent, and preferably 10 to 22 weight-percent is used. Otherwise, the dispersion consists essentially of the high-boiling organic solvent, desirably in an amount of 25 to 65%, preferably from 35 to 55%, by weight.

From the dispersions thus obtained, or from a mixture thereof, the solutions of polyvinylidene fluoride in the low-boiling polar organic solvent, which contains ultraviolet light absorbing agents and additional resins if desired, are prepared. Preferred for this purpose are ketones with boiling points up to about 100° C., and especially preferred is acetone with a moisture content under 0.5 wt.-%. The amount of the low-boiling polar organic solvent in the total mixture is 60 to 90%, by weight.

Basically, all plastics, preferably all poorly weathering plastics, are substrate material for the varnish of the invention and for the method of the invention, and specifically both thermoplastics and thermosets. The following are given by way of example: polyvinyl chloride of the hard or soft type, polyvinyl esters, polyvinyl acrylates, polystyrenes, polynitriles, triazine resins, that is, condensation products on a basis of melamine and/or quanamine and formaldehyde, and urea-formaldehyde condensation products including their modifications obtained by means of certain additives. Reinforcing fabrics or glass fiber mats coated with polyvinyl chloride or polyester can additionally be coated with polyvinylidene fluoride and thus stabilized against weathering influences. Any decorative finish varnish that may already be present on the product to be coated will not conflict with the coating, but in some cases will even provide a certain adhesivizing undercoating effect.

The solutions of the starting dispersions in the low-boiling organic solvents can, in accordance with the invention, be air-dried at room temperature after application, drying times of as much as 16 hours, however, being required. In order to anchor the polyvinylidene fluoride film or the film consisting substantially of polyvinylidene fluoride sufficiently to the substrate, and also for the complete removal of residual amounts of solvent, a subsequent heat treatment is necessary.

One preferred embodiment of the method of the invention consists in performing the film-forming of the polyvinylidene fluoride quickly by evaporating the solvent used. In this case a firmly adherent anchoring of the polyvinylidene fluoride film to the substrate simultaneously takes place, and a pore-free, transparent and glossy coating is obtained.

In order to achieve to the full degree the film forming and protective properties of the polyvinylidene fluoride coating, it is recommendable to apply the polyvinylidene fluoride film, containing additional additives if desired, in a coating thickness of 1 to 10 μm, preferably 2 to 6 μm.

100° to 300° C. is suitable as the temperature range for the thermal after-treatment forming part of the method of the invention. Preferably it is performed in the temperature range from 100° to 250° C., the duration of the after-treatment amounting to 1 to 15 minutes, preferably 1 to 10 minutes, and especially preferably 1 to 5 minutes.

The thermoplastic or thermosetting plastic materials coated with polyvinylidene fluoride have the advantage that the polyvinylidene flouride film prevents degradation reactions at the surface by weathering influences, and the loss of stabilizers and plasticizers by diffusion, and therefore the physical properties of the support or substrate materials, such as hardness, tensile strength and surface quality, are preserved. The extremely strong bond achieved by the heat treatment furthermore assures that, even after long outdoor weathering, no loss of adhesion of the coating to the substrate material will occur. Consequently products previously unsuitable for outdoor use, such as soft polyvinyl chloride, or laminates coated with melamine-formaldehyde condensation products, become usable even for purposes which formerly were reserved for other materials. But also fabrics having a reinforcing action, coated with polyvinyl chloride or other plastics, can, by the additional application of polyvinylidene fluoride, be made weatherproof and can be used for weatherproof purposes, such as, for example, truck tarpaulins, tents, inflatable buildings, shelters for construction work, and glass fiber-reinforced boards.

The following examples will serve for the further explanation of the invention. A number of typical varnish formulas are given whose optimum working conditions are given as well as the properties of the coatings they produce.

EXAMPLES 1 to 15

Polyvinylidene fluoride is dispersed in a high-boiling organic solvent, such as cyclohexaone, for example, at room temperature, by means of high-speed stirrer or dissolver. After the dispersion is prepared, the strongly polar, latent solvent, such as dimethyl formamide etc., is added. It is also possible, however, to mix in this strongly polar, organic solvent right at the beginning of the dispersion.

The prepared dispersion is then dissolved in the appropriate amount in the low-boiling organic solvent. If acetone, for example, is used, a dissolution temperature of approximately 50° C. suffices, and within a few minutes a clear to, in some cases, slightly opalescent solution is obtained. This solution can be used after it has been cooled down to room temperature. If desired, ultraviolet light absorbing agents as well as additive resin are predissolved in, for example, acetone. If epichlorhydrin or chlorinated hydrocarbons are used in the formula, it is recommendable not to add these strongly polar organic solvents until after the solution is obtained in ketones.

The application of the polyvinylidene fluoride solution to the substrate material was performed with a squeegee, a film drawing apparatus or also simply with a brush. A baking oven with forced air circulation was used for baking-on the solutions.

The various solvents used, their amount, the plastics used and the properties of the coating are all shown in the following table.

| | Examples | | | | |
|---|---|---|---|---|---|
| No. | 1 | 2 | 3 | 4 | 5 |
| Composition (wt.-%) | | | | | |
| Polyvinylidene fluoride | 5.625 | 5.625 | 5.625 | 9.375 | 9.375 |
| Strongly polar solvent | 1.500 DMFA | 1.500 DMFA 0.450 THF | 3.75 PC | 2.500 | 2.500 DMAA 0.750 THF |
| Cyclohexanone/butyl-acetate/ethylene glycol acetate | 7.875 CH or BA or EGA | 7.425 CH or BA or EGA | 5.625 CH | 13.125 CH or BA or EGA | 12,375 CH or BA or EGA |
| Organic solvent | 85.000 ACT | 85.000 ACT | 85.000 ACT | 75.000 ACT | 75.000 ACT |
| Coating | | | | | |
| Substrate | Soft PVC unvarnished | Soft PVC unvarnished | Soft PVC varnished | Soft PVC varnished | Soft PVC unvarnished |
| Application | Squeegee | Film draw frame | Squeegee | Film draw frame | Squeegee |
| Drying or airing time at room temperature | 16 h | — | 2 min. | — | — |
| Temperature during the after-treatment | 160° C. | 165° C. | 170° C. | 160° C. | 165° C. |
| Duration of the after-treatment | 4 min | 1 min | 2 min | 3 min | 2 min |
| Dry film thickness | 3–5 μm | 4 μm | 5 μm | 4 μm | 5 μm |
| Gloss | Glossy | Glossy | Glossy | Glossy | Glossy |
| Transparency | Transparent | Transparent | Transparent | Transparent | Transparent |
| Elasticity | Excellent | Excellent | Excellent | Excellent | Excellent |
| Adhesion | Good | Good | Excellent | Excellent | Good to excellent. |

| No. | 6 | 7 | 8 | 9 | 10 |
|---|---|---|---|---|---|
| Composition (wt.-%) | | | | | |
| Polyvinylidene fluoride | 9.375 | 9.375 | 13.125 | 8.900 | 8.200 |
| Strongly polar solvent | 5.000 DMFA | 6.250 DMFA | 3.500 DMAA or DEAA | 4.800 EHD | 6.500 MCH |
| Cyclohexanone/butyl-acetate/ethylene glycol acetate | 10.625 CH | 9.375 CH or BA | 18.375 CH | 14.900 CH | 14.600 CH |
| Organic solvent | /5.000 MEK | 75.000 ACT | 65.000 ACT | 71.400 ACT | 70.700 MEK |
| Coating | | | | | |
| Substrate material | Soft PVC varnished | PVC unvarnished | Soft PVC varnished | Glass fiber-reinforced polyester boards | |
| Application | Film draw frame | Squeegee | Squeegee | Film draw frame | Film draw frame |
| Drying or airing time at room temperature | — | — | — | — | — |
| Temperature during after-treatment | 160° C. | 150° C. | 170° C. | 160° C. | 160° C. |
| Duration of after-treatment | 2 min | 4 min | 2 min | 3 min | 2 min |
| Dry film thickness | 3–5 μm | 6 μm | 8 μm | 5 μm | 5 μm |
| Gloss | Glossy | Glossy | Glossy | Glossy | Glossy |
| Transparency | Transparent | Transparent | Transparent | Transparent | Transparent |
| Elasticity | Excellent | — | Excellent | Good | Still good |
| Adhesion | Excellent | Excellent | Good | Good | Good |

| No. | 11 | 12 | 13 | 14 | 15 |
|---|---|---|---|---|---|
| Composition (wt.-%) | | | | | |
| Polyvinylidene fluoride | 7.50 | 8.44 | 6.56 | 7.50 | 6.56 |
| Strongly polar solvent | 4.00 ACA | 4.50 ACA 0.67 THF | 3.50 ACA | 5.00 DMFA or DEFA | 3.50 ACA |
| Cyclohexanone/butyl-acetate/ethylene glycol acetate/diisobutylketone/diacetone alcohol/dibutylketone | 8.50 DAA | 8.89 DAA | 7.44 DIBK | 3.45 CH 3.45 BA | 7.44 DIBK or DBK |
| Organic solvent | 80.00 ACT | 77.50 MEK | 82.50 ACT or 20.00 MEK | 60.00 ACT | 55.00 ACT 27.50 MEK |
| Coating | | | | | |
| Substrate material | Polyacrylate unvarnished | PVC unvarnished | Soft PVC varnished | Soft PVC unvarnished | PVC unvarnished |
| Application | Film draw frame | Film draw frame | Squeegee | Squeegee | Film draw frame |
| Drying or airing time at room temperature | — | — | — | — | — |
| Temperature during | 150° C. | 155° C. | 165° C. | 170° C. | 160° C. |

|  | Examples | | | | |
|---|---|---|---|---|---|
| after-treatment | | | | | |
| Duration of the after-treatment | 2 min | 3 min | 3 min | 2 min | 3 min |
| Dry film thickness | 3–5 | 7 | 3–4 | 3–5 | 3–4 |
| Gloss | Glossy | Glossy | Glossy | Glossy | Slight gloss |
| Transparency | Transparent | Transparent | Transparent | Transparent | Still transparent |
| Elasticity | Good | Good | Good | Good | Good |
| Adhesion | Very good | Very good | Good to excellent | Good to excellent | Excellent |

| No. | 16 | 17 |
|---|---|---|
| Composition (wt.-%) | | |
| Polyvinylidene fluoride | 9.375 | 5.625 |
| Strongly polar solvent | 2.500 DMAA | 1.500 DMFA |
|  | 0.750 THF | 0.450 THF |
| Cyclohexanone/butyl acetate/ethylene glycol acetate | 12.375 CH | 7,425 CH or BA |
| Organic solvent | 74.900 ACT | 74.410 ACT |
| Ultraviolet light absorbing agent | 0.100 TVP:TV 770 = 80:20 | 0.010 Uvinul N 35 |
| Additive | — | 0.280 Synthalat A 190 Desmodur N 75 |
| Coating | | |
| Substrate material | Soft PVC, varnished | Soft PVC, unvarnished |
| Application | Squeegee | Film draw frame |
| Drying or airing time at room temperature | — | — |
| Temperature during after-treatment | 170° C. | 170° C. |
| Duration of the after-treatment | 3 min | 2.5 min |
| Dry film thickness | 7 μm | 8 μm |
| Gloss | Glossy | Glossy |
| Transparency | Transparent | Transparent |
| Elasticity | Very good | Very good |
| Adhesion | good to very good | very good |

ACA = acetyl acetone
ACT = acetone
BA = butyl acetate
CH = cyclohexanone
DAA = diacetone alcohol
DBK = dibutylketone
DEAA = diethylacetamide
DEFA = diethylformamide
DIBK = diisobutyl ketone
DMAA = dimethylacetamide
DMFA = dimethylformamide
EGA = ethylene glycol acetate
EHD = epichlorhydrin
MCH = methylene chloride, chloroform
MEK = methyl ethyl ketone
PC = propylene carbonate
THF = tetrahydrofuran
TV = tinuvin

I claim:

1. Bake-on varnish for the weather-proof coating of plastics, characterized by a content of 3 to 25 wt.-% of polyvinylidene fluoride, 5 to 20 wt.-% of at least one high-boiling organic solvent having a boiling point from about 126° C. to about 250° C., 1 to 10 wt.-% of at least one strongly polar latent organic solvent for polyvinylidene fluoride and 60 to 90 wt.-% of a low-boiling polar organic solvent having a boiling point up to 120° C.

2. Varnish of claim 1, characterized in that it contains 4 to 16 weight-percent of polyvinylidene fluoride.

3. Varnish of claim 1 or 2, characterized in that it contains 2 to 7 wt.-% of strongly polar latent organic solvent.

4. Varnish of claim 1, characterized in that it contains as high-boiling organic solvent cyclohexanone, butyl acetate, diacetone alcohol, dibutylketone, diisobutylketone and/or ethylene glycol acetate.

5. Varnish of claim 1 or 4, characterized in that it contains as low-boiling polar organic solvent a ketone having a boiling point up to 100° C.

6. Varnish of claim 5, characterized in that it contains as ketone acetone having a moisture content of no more than 0.5 wt.-%.

7. Varnish of claim 1 or 4, characterized in that it contains as strongly polar latent organic solvent dimethylphthalate, dimethylformamide, diethylformamide, dimethylacetamide, diethylacetamide, acetylacetone, propylene carbonate, methyl ethyl ketone, tetrahydrofuran, epichlorohydrin, methylene chloride and/or chloroform.

8. In a method of coating plastics with polyvinylidene fluoride, the steps of dispersing 20 to 60 wt % finely divided polyvinylidene fluoride in
  (a) 25 to 65 wt-% of at least one high-boiling, organic solvent having a boiling point from about 126° C.

to about 250° C., which dissolves polyvinylidene fluoride slightly or not at all, and (b) 5 to 30 wt-% of at least one strongly polar latent organic solvent for polyvinylidene fluoride, and thereafter dissolving the dispersion obtained (c) in 60 to 90 wt-% of at least one low-boiling polar organic solvent having a boiling point up to 120° C., coating the plastic surface with the solution and baking the coating on the surface at a temperature of 100° to 300° C.

9. Method of claim 8, characterized in that, for the preparation of the dispersion, there is used a high-boiling organic solvent having a boiling point in the range of about 126° C. to about 250° C.

10. Method of claim 9, characterized in that 30 to 40 wt.-% of polyvinylidene fluoride is used.

11. Method of claim 8 or 9, characterized in that a polyvinylidene fluoride having an average primary particle weight under 0.5 μm is used.

12. Method of claim 9, characterized in that 35 to 55 wt.-% of high-boiling solvent is used.

13. Method of claim 9, characterized in that 10 to 22 wt.-% of strongly pair latent solvent is used.

14. Method of claim 9, characterized in that 60 to 90 wt.-% of lowboiling polar organic solvent is used.

15. Method of claim 14, characterized in that ketones of boiling points up to 100° C. are used as low-boiling polar organic solvent.

16. Method of claim 15, characterized in that acetone having a moisture content under 0.5 wt.-% is used.

17. Method of claim 8, characterized in that a baking temperature of 100° to 250° C. is applied.

18. Method of claim 8, characterized in that baking is performed for 1 to 5 minutes.

19. Varnish of claim 1 wherein the high-boiling organic solvent has a boiling point in the range of about 126° C. up to about 250° C. and the low-boiling solvent has a boiling point in the range of about 56° C. up to about 100° C.

20. The method of claim 8 wherein said plastics comprises a fabric reinforced polyvinyl chloride or polyester.

* * * * *